(12) United States Patent
Davydov et al.

(10) Patent No.: US 11,671,954 B2
(45) Date of Patent: Jun. 6, 2023

(54) UE CONFIGURED FOR JOINT ACTIVATION OF TCI STATES AND SPATIAL RELATION INFO ON MULTIPLE COMPONENT CARRIERS

(71) Applicant: Intel Corporation, Santa Clara, CA (US)

(72) Inventors: Alexei Davydov, Nizhny Novgorod (RU); Avik Sengupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 17/036,055

(22) Filed: Sep. 29, 2020

(65) Prior Publication Data

US 2021/0014848 A1    Jan. 14, 2021

Related U.S. Application Data

(60) Provisional application No. 62/911,100, filed on Oct. 4, 2019.

(51) Int. Cl.
*H04W 72/04*     (2023.01)
*H04W 72/044*    (2023.01)
*H04L 5/00*      (2006.01)
*H04W 72/23*     (2023.01)

(52) U.S. Cl.
CPC ......... *H04W 72/046* (2013.01); *H04L 5/0051* (2013.01); *H04W 72/23* (2023.01)

(58) Field of Classification Search
CPC ............ H04W 72/046; H04W 72/042; H04W 72/044; H04L 5/0051; H04L 5/0098; H04L 5/001; H04L 5/0023; H04L 5/0048; H04B 7/0695; H04B 7/088
See application file for complete search history.

(56) References Cited

U.S. PATENT DOCUMENTS

| | | | |
|---|---|---|---|
| 2014/0036859 A1* | 2/2014 | Ekpenyong | H04W 72/042 370/330 |
| 2019/0254076 A1* | 8/2019 | Siomina | H04W 24/10 |
| 2019/0296805 A1* | 9/2019 | Son | H04W 76/27 |
| 2019/0349964 A1* | 11/2019 | Liou | H04W 72/046 |

* cited by examiner

*Primary Examiner* — Kiet Tang
(74) *Attorney, Agent, or Firm* — Schwegman Lundberg & Woessner, P.A.

(57) ABSTRACT

Embodiments of a user equipment (UE) configured for operation in a fifth generation (5G) new radio (NR) network are disclosed herein. In some embodiments, a media access control Layer (MAC) control element (CE) (MAC CE) may activate a spatial relation info for a sounding reference signal (SRS) resource for two or more indicated component carriers (CCs). The spatial relation info for the SRS resource for the two or more indicated CCs may be applied in response to the activation. The SRS resource may be transmitted in the two or more indicated CCs with a same spatial transmission filter that is used for another reference signal configured in the spatial relation info when the UE is configured with one or more SRS resource configurations and when the spatial relation info is activated.

20 Claims, 2 Drawing Sheets

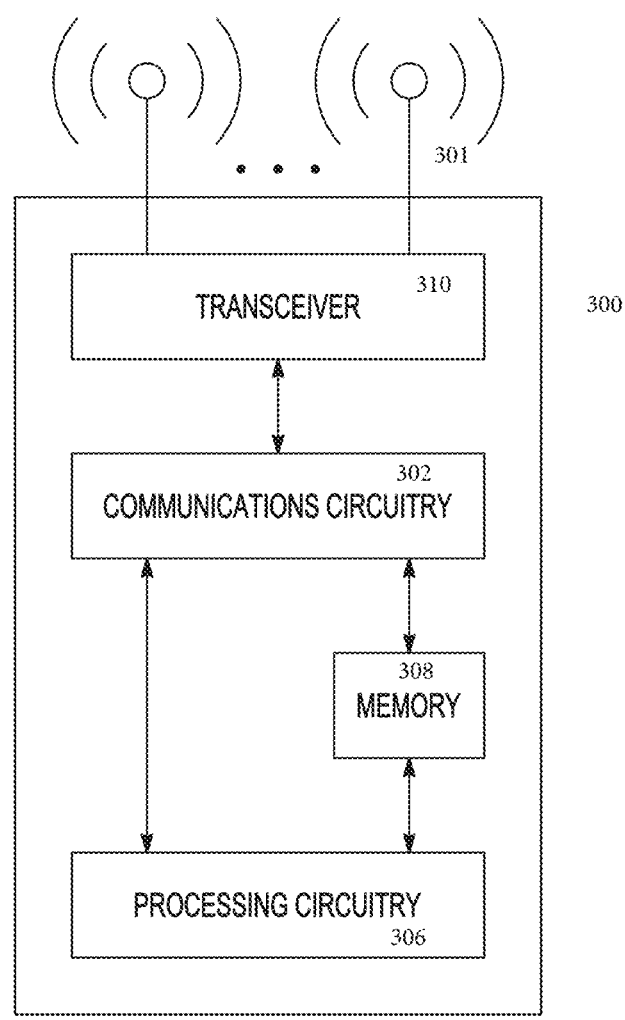

UE CONFIGURED FOR JOINT ACTIVATION OF TCI STATES AND SPATIAL RELATION INFO ON MULTIPLE COMPONENT CARRIERS

PRIORITY CLAIM

This application claims priority under 35 U.S.C. 119(e) to U.S. Provisional Patent Application Ser. No. 62/911,100, filed Oct. 4, 2019 [reference number AC5422-Z] which is incorporated herein by reference in its entirety.

TECHNICAL FIELD

Embodiments pertain to wireless communications. Some embodiments relate to fifth generation (5G) new radio (NR) communications. Some embodiments relate to carrier aggregation (CA) in 5G NR. Some embodiments relate to transmission of uplink reference signals in 5G NR.

BACKGROUND

One issue in 5G NR with carrier aggregation (CA) in FR2 is that receive beams may be shared across multiple component carriers (CCs). Signaling overhead with activation of Transmission Configuration Indicator (TCI) states per CC can lead to latency issues. Thus, there are needs to indicate the same beam on multiple CCs using a single activation message.

BRIEF DESCRIPTION OF THE DRAWINGS

FIG. 3 illustrates a communication station, suitable for use as a UE, in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, a media access control Layer (MAC) control element (CE) (MAC CE) may activate a spatial relation info for a sounding reference signal (SRS) resource for two or more indicated component carriers (CCs). The spatial relation info for the SRS resource for the two or more indicated CCs may be applied in response to the activation. The SRS resource may be transmitted in the two or more indicated CCs with a same spatial domain transmission filter that is used for another reference signal configured in the spatial relation info when the UE is configured with one or more SRS resource configurations and when the spatial relation info is activated. These embodiments are discussed in more detail below.

In some embodiments, a UE may decode radio-resource control (RRC) signalling received from a generation Node B (gNB) to configure the UE with one or more Transmission Configuration Indicator (TCI) states. Each TCI state may define a quasi co-location (QCL) relationship between a downlink reference signal (DL RS) and demodulation reference signal (DMRS) antenna ports. In these embodiments, the UE may decode a MAC CE to activate one of the TCI states for one of the CCs with a QCL-TypeD reference signal relationship. In response to the activation of one of the TCI states, the UE may to apply (e.g., assume activation of) the activated TCI state for other CCs with a same QCL-TypeD reference signal relationship. In these embodiments, when the UE receives activation of a TCI state for a CC with a QCL-TypeD reference signal, all other TCI states on other CCs with the same reference signal in QCL Type D part of TCI may also be activated. These embodiments are discussed in more detail below.

Figure 1:
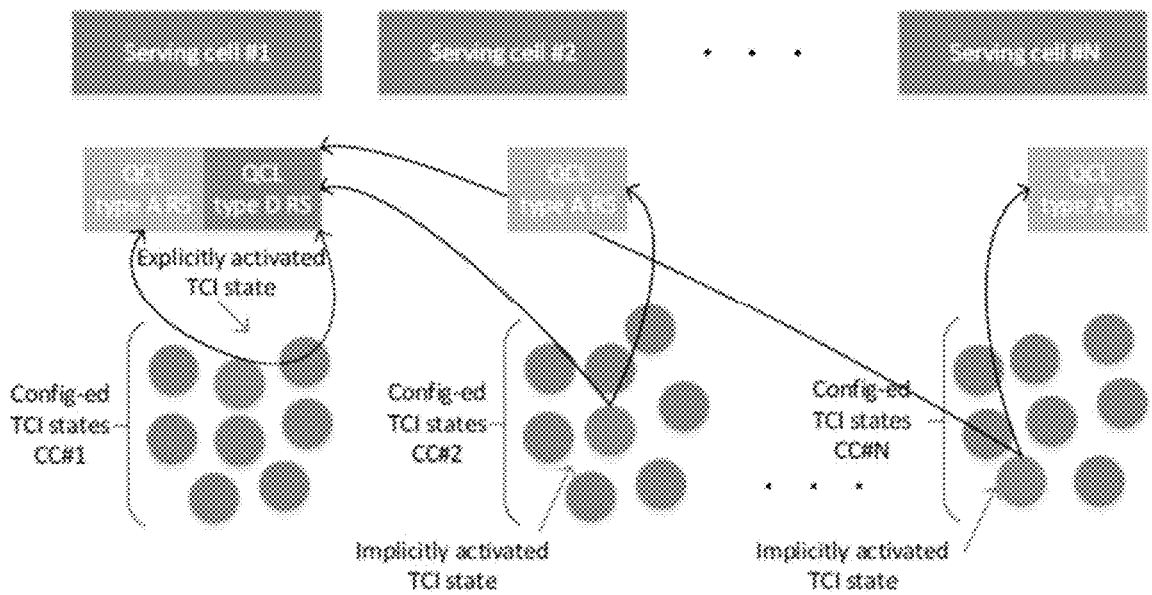
FIG. 1 illustrates joint activation of Transmission Configuration Indicator (TCI) states on multiple component carriers (CCs) in accordance with some embodiments.

FIG. 1 illustrates joint activation of Transmission Configuration Indicator (TCI) states on multiple component carriers (CCs) in accordance with some embodiments. In these embodiments, if a UE receives activation of TCI state for a CC with a QCL-Type D reference signal, all other TCI states on other CC with the same reference signal in QCL-Type D part of TCI may also be activated. These embodiments are described in more detail below.

In carrier aggregation (CA) scenarios for FR2, the receive (RX) beam at the UE is typically shared across multiple CCs due to implementation constraints. On the other hand, beam indication for PDSCH and PDCCH is performed by activation of TCI states on per CC basis. As the results in CA configuration, multiple MAC CE should be indicated to the UE to indicate the same beam on different CC. More specifically, in FR2 TCI state includes up to two reference signal configurations and associated QCL types. Based on the reference signal configuration, UE derives QCL parameters from the configured reference signal. In particular, if the reference signal with QCL-TypeD is configured in TCI state, the UE derives the Rx beam based on the measurement of the corresponding reference signal. It should be noted that reference signal associated with QCL-TypeD can be from the same or other CC where TCI state is used/configured.

```
-- ASN1START
-- TAG-TCI-STATE-START
TCI-State ::=           SEQUENCE {
    tci-StateId             TCI-StateId,
    qcl-Type1               QCL-Info,
    qcl-Type2               QCL-Info      OPTIONAL,   -- Need R
    ...
}
QCL-Info ::=            SEQUENCE {
    cell                    ServCellIndex OPTIONAL,   -- Need R
    bwp-Id                  BWP-Id
OPTIONAL, -- Cond CSI-RS-indicated
    referenceSignal         CHOICE {
        csi-rs                  NZP-CSI-RS-ResourceId,
        ssb                     SSB-Index
    },
    qcl-Type                ENUMERATED {typeA, typeB, typeC,
                            typeD},
    ...
}
-- TAG-TCI-STATE-STOP
-- ASN1STOP
```

Prior to this disclosure, there was no mechanism to indicate the same beam on multiple CCs using one MAC CE message. Prior techniques had large signaling overhead and latency due to per-CC MAC CE transmission.

In this disclosure we propose to support beam indication across multiple CCs when beam management is carried out on one CC and the acquired beam is reused on another CC by using cross-carrier QCL-Type D signaling. Once UE receive activation of TCI state for a CC with QCL-TypeD reference signal, all other TCI state(s) on other CC with the same reference signal in QCL-TypeD part of TCI should be also assumed as activated. In addition, joint activation for UL using reference signal configured in spatial relation info is also proposed. The disclosed techniques provide reduced signaling overhead and fast downlink and uplink beam activation on multiple CCs.

In this disclosure, joint activation of TCI states is proposed from different CC based on a reference signal configured with QCL-TypeD on one CC. In this case it is assumed that beam management is carried out on one CC and the acquired beam is reused on another CC by using cross carrier QCL-Type D signalling.

According to present disclosure, once a UE receives activation of a TCI state for a CC with QCL-TypeD reference signal, all other TCI state(s) on other CCs with the same reference signal in QCL-TypeD part of TCI should be also assumed as activated. Examples of this are illustrated in FIG. 1.

According to example of the embodiment, the reference signal associated with QCL-TypeD is SS/PBCH or CSI-RS for beam management (L1-RSRP). According to another example embodiment of this disclosure, a reference signal associated with QCL-TypeA part of the TCI state should be from the same CC as corresponding TCI state configuration. According to the example of this embodiment the reference signal associated with QCL-TypeA part of the TCI state is tracking reference signal (CSI-RS configured with trfInfo parameter) or CSI-RS configured for CSI acquisition.

In these embodiments, a UE may decode radio-resource control (RRC) signalling received from a generation Node B (gNB) to configure the UE with one or more Transmission Configuration Indicator (TCI) states. Each TCI state may define a quasi co-location (QCL) relationship between a downlink reference signal (DL RS) and demodulation reference signal (DMRS) antenna ports. In these embodiments, the UE may decode a MAC CE to activate one of the TCI states for one of the CCs with a QCL-TypeD reference signal relationship. In response to the activation of one of the TCI states, the UE may to apply (e.g., assume activation of) the activated TCI state for other CCs with a same QCL-TypeD reference signal relationship. In these embodiments, when the UE receives activation of a TCI state for a CC with a QCL-TypeD reference signal, all other TCI states on other CCs with the same reference signal in QCL Type D part of TCI may also be activated.

In some of these embodiments, each TCI state may define the QCL relationship between at least one of a DL RS and physical downlink control channel (PDCCH) DMRS antenna ports and/or a DL RS physical downlink shared channel (PDSCH) DMRS antenna ports. The DL RS that is associated with the QCL-TypeD reference signal relationship may comprises one or more of a SS/PBCH or CSI-RS for beam management (e.g., L1-RSRP).

In some of these embodiments, the UE may be configured to decode a PDCCH or PDSCH in the CCs in accordance with carrier aggregation (CA) based in the QCL-TypeD reference signal relationship. In these embodiments, the CCs comprising the CC with the TCI that was activated by the MAC CE and the other CCs with an implicitly activated TCI state. In some embodiments, the UE may also be configured to decode a PDSCH the CCs in accordance with carrier aggregation (CA) based in the QCL-TypeD reference signal relationship.

In some of these embodiments, the QCL-TypeD reference signal relationship may comprise a spatial receive (RX) parameter to support beamforming at the UE. In these embodiments, signals have one or more common properties transmitted by different antenna ports are said to have a quasi co-location (QCL) relationship. Two antenna ports are said to be quasi co-located if properties of the channel over which a symbol on one antenna port is conveyed can be inferred from the channel over which a symbol on the other antenna port is conveyed.]

In some of these embodiments, the UE may be configured to transmit the SRS resource in an active UL BWP of the CCs according to the spatial relation with a reference to the reference signal with the QCL-TypeD in the activated TC state or other reference signals used for beam management.

Figure 2:
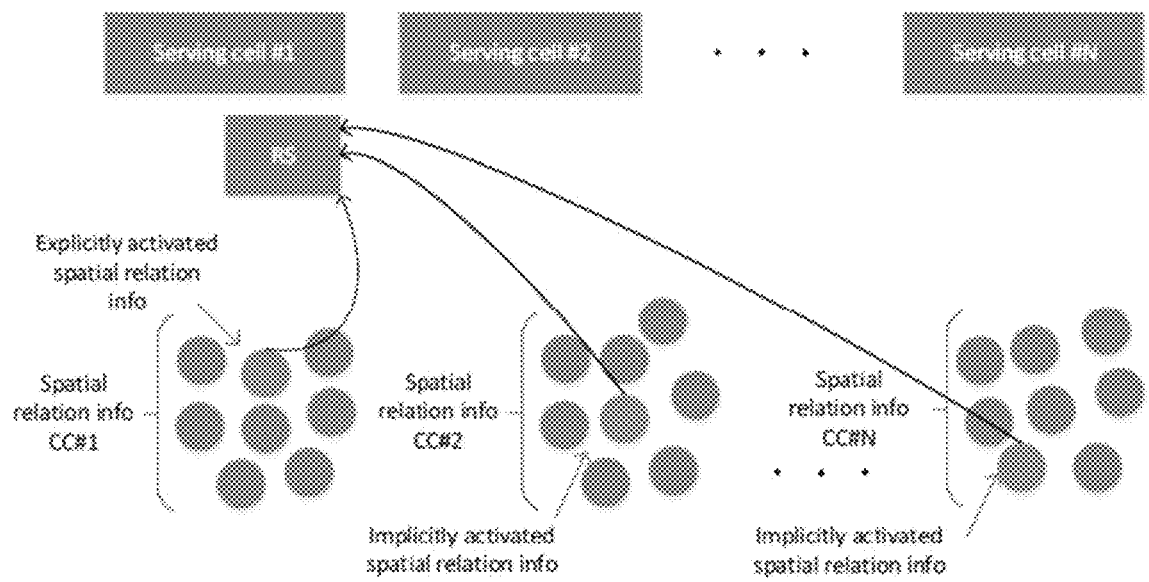
FIG. 2 illustrates joint activation of spatial relation info on multiple CCs in accordance with some embodiments.

FIG. 2 illustrates joint activation of spatial relation info on multiple CCs in accordance with some embodiments. In these embodiments, spatial relation info for dedicated PUCCH or for SRS (except SRS for beam management) can be jointly activated on multiple CCs using similar principles. In particular, if the spatial relation info is activated on one CC, the spatial relation info configured on other CC with the same reference signal should be assumed as activated as well.

In these embodiments, a media access control Layer (MAC) control element (CE) (MAC CE) may activate a spatial relation info for a sounding reference signal (SRS) resource for two or more indicated component carriers (CCs). The spatial relation info for the SRS resource for the two or more indicated CCs may be applied in response to the activation. The SRS resource may be transmitted in the two or more indicated CCs with a same spatial transmission filter that is used for another reference signal configured in the spatial relation info when the UE is configured with one or more SRS resource configurations and when the spatial relation info is activated.

In some embodiments, when the UE is configured for reception of a downlink reference signal configured in the spatial relation info, the UE may be configured to transmit the SRS resource in the two or more indicated CCs with a same spatial transmission filter that is used for reception of the downlink reference signal that is configured in the spatial relation info (e.g., when the UE is configured with two or more SRS resource configurations and when the spatial relation info is activated). In these embodiments, the downlink reference signal may comprise one of a synchronization signal/physical broadcast channel (SS/PBCH) block or a channel state information reference signal (CSI-RS).

In some embodiments, when the UE is configured for transmission of an uplink reference signal with the spatial relation info, the UE may be configured to transmit the SRS resource in the two or more indicated CCs with a same spatial transmission filter that is used for transmission of the uplink reference signal configured in the spatial relation info (e.g., when the UE is configured with two or more SRS resource configurations and when the spatial relation info is activated).

In some embodiments, the UE may be configured to apply the spatial relation info for SRS resources with a same SRS resource ID as the SRS resource indicated in the MAC CE for active bandwidth parts (BWPs) in the indicated CCs. In some embodiments, the UE may apply the spatial relation info for SRS resources with a same SRS resource ID as the SRS resource indicated in the MAC CE for all BWPs in the indicated CCs (e.g., active BWPs as well as BWPs that are not active), although the scope of the embodiments is not limited in this respect.

In some embodiments, when the UE is configured for beam management, spatial receive parameters acquired for a CC are reused for other CCs.

In some embodiments, transmission of the SRS resource in in the two or more CCs comprise a joint beam transmission in a millimeter-wave frequency band (e.g., frequency range two (FR2) (e.g., 24.25 GHz-52.6 GHz) although the scope of the embodiments is not limited in this respect as other millimeter wave frequency bands may also be used).

In the other embodiments of the disclosure, the default beam for a dedicated PUCCH or SRS, except SRS for beam management, should follow the active TCI state.

FIG. 3 illustrates a communication station, suitable for use as a UE, in accordance with some embodiments. The communication station 300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 300 may include communications circuitry 302 and a transceiver 310 for transmitting and receiving signals to and from other communication stations using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The communication station 300 may also include processing circuitry 306 and memory 308 arranged to perform the operations described herein. In some embodiments, the communications circuitry 302 and the processing circuitry 306 may be configured to perform operations detailed in the above figures, diagrams, and flows.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the communication station 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication station 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 300 may include one or more of a keyboard, a display, a non-volatile memory port, multiple antennas, a graphics processor, an application processor, speakers, and other mobile device elements. The display may be an LCD screen including a touch screen.

Although the communication station 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 300 may refer to one or more processes operating on one or more processing elements.

Example 1 may include the system and method of joint TCI activation for two more component carrier wherein method include:
  MAC CE based activation of TCI state one component carrier (CC) with reference signal configured in QCL type D part of TCI state
  Identification of the other TCI state on other CC with the same reference signal configured in QCL type D part of TCI state
  Implicit activation of the identified TCI states for PDSCH.

Example 2 may include the system and method of example 1 or some other example herein, wherein QCL type D is SS/PBCH or CSI-RS for beam management (L1-RSRP).

Example 3 may include the system and method of example 1 or some other example herein, wherein reference signal associated with QCL type A part of the TCI state should be from the same CC as corresponding TCI state configuration.

Example 4 may include the system and method of example 1 or some other example herein, wherein spatial relation info for dedicated PUCCH and SRS except SRS for beam management with the same reference signal as reference signal configured in QCL type D part of TCI state is also activated.

Example 5 may include the system and method of joint spatial relation info activation for two more component carrier wherein method include MAC CE based activation of spatial relation info (CC) with reference signal that determines transmit spatial filter Identification of the other active spatial relation info on other CC with the same reference signal configured that is used to determine transmit spatial filter Implicit activation of the identified spatial relation info on other CC for dedicated PUCCH and SRS except beam management SRS.

Example 6 may include the system and method of example 5 or some other example herein, wherein reference signal in spatial relation is one of SS/PBCH, CSI-RS for L1-RSRP.

Example 7 may include the system and method of example 5 or some other example herein, wherein reference signal in spatial relation is SRS for beam management.

Example 8 may include a method comprising:
receiving a MAC CE to indicate a TCI state for a first component carrier (CC), wherein the TCI state includes a reference signal configured for quasi co-location (QCL) type D;
determine that a second CC is associated with the reference signal via QCL;
using the indicated TC state to communicate on the second CC based on the determination.

Example 9 may include the method of example 8 or some other example herein, wherein the reference signal is an SS/PBCH block (SSB) or a CSI-RS.

Example 10 may include the method of example 8-9 or some other example herein, wherein the TCI state further includes a reference signal configured for QCL type A that is transmitted on the first CC.

Example 11 may include the method of example 8-10 or some other example herein, further comprising receiving spatial relation information for the first CC and applying the spatial relation information to communicate on the second CC based on the determination.

Example 12 may include the method of example 11 or some other example herein, wherein the spatial relation information is for dedicated physical uplink control channel (PUCCH) and/or sounding reference signal (SRS) other than SRS for beam management.

Example 13 may include the method of example 8-12 or some other example herein, wherein using the indicated TCI state to communicate on the second CC includes determining a receive beam and/or a transmit beam based on the indicated TCI state.

Example 14 may include the method of example 8-13 or some other example herein, wherein the method is performed by a UE or a portion thereof.

Example 15 may include a method comprising:
receiving a MAC CE to indicate spatial relation information for a first component carrier (CC) that is associated with a reference signal configured for quasi co-location (QCL) type D;
determine that a second CC is associated with the reference signal via QCL;
using the indicated spatial relation information to communicate on the second CC based on the determination.

Example 16 may include the method of example 15 or some other example herein, wherein the spatial relation information is for dedicated physical uplink control channel (PUCCH) and/or sounding reference signal (SRS) other than SRS for beam management.

Example 17 may include the method of example 15-16 or some other example herein, wherein the reference signal is an SS/PBCH block (SSB) or a CSI-RS.

Example 18 may include the method of example 15-17 or some other example herein, wherein using the indicated spatial relation information includes determining a receive filter or a transmit filter.

Example 19 may include the method of example 15-18 or some other example herein, wherein the method is performed by a UE or a portion thereof.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation (5G) new radio (NR) network, the apparatus comprising: processing circuitry; and memory, the processing circuitry configured to:
   decode a media access control Layer (MAC) control element (CE) (MAC CE) to activate a spatial relation info for a sounding reference signal (SRS) resource for two or more indicated component carriers (CCs);
   apply the spatial relation info for the SRS resource for the two or more indicated CCs in response to the activation; and
   when the spatial relation info is activated, configure the UE to transmit the SRS resource in the two or more of the indicated CCs with a same spatial transmission filter that is used for another reference signal configured in the spatial relation info when the UE is configured with one or more SRS resource configurations,
   wherein transmission of the SRS resource in the two or more CCs comprises a joint beam transmission in accordance with carrier aggregation (CA) in a millimeter-wave frequency band (FR2), and
   wherein the memory is configured to store the MAC CE.

2. The apparatus of claim 1, wherein the processing circuitry is further configured to:
   decode radio-resource control (RRC) signalling received from a generation Node B (gNB) to configure the UE with one or more Transmission Configuration Indicator (TCI) states, each TCI state defining a quasi co-location (QCL) relationship between a downlink reference signal (DL RS) and demodulation reference signal (DMRS) antenna ports,
   decode another MAC CE to activate one of the TCI states for one of the CCs with a QCL-TypeD reference signal relationship;
   wherein in response to the activation of one of the TCI states, the processing circuitry is configured to apply the activated TCI state for other CCs with a same QCL-TypeD reference signal relationship.

3. The apparatus of claim 2, wherein each TCI state defines the QCL relationship between at least one of a DL RS and physical downlink control channel (PDCCH) DMRS antenna ports or a DL RS and physical downlink shared channel (PDSCH) DMRS antenna ports, and
   wherein the downlink reference signal that is associated with the QCL-TypeD reference signal relationship comprises one or more of a SS/PBCH or CSI-RS for beam management,
   wherein the processing circuitry is further configured to decode a PDCCH or PDSCH in the CCs in accordance with carrier aggregation (CA) based in the QCL-TypeD reference signal relationship, the CCs comprising the CC with the TCI that was activated by the MAC CE and the other CC.

4. The apparatus of claim 2, wherein the QCL-TypeD reference signal relationship comprises a spatial receiver (RX) parameter to support beamforming at the UE, and
wherein the processing circuitry is to configure the UE to transmit the SRS resource in an active uplink (UL) bandwidth part (BWP) of the CCs according to the spatial relation with a reference to the reference signal with the QCL-TypeD in the activated TCI state.

5. An apparatus for a user equipment (UE) configured for operation in a fifth-generation (5G) new radio (NR) network, the apparatus comprising: processing circuitry; and memory, the processing circuitry configured to:
decode a media access control Layer (MAC) control element (CE) (MAC CE) to activate a spatial relation info for a sounding reference signal (SRS) resource for two or more indicated component carriers (CCs);
apply the spatial relation info for the SRS resource for the two or more indicated CCs in response to the activation; and
when the spatial relation info is activated, configure the UE to transmit the SRS resource in the two or more of the indicated CCs with a same spatial transmission filter that is used for another reference signal configured in the spatial relation info when the UE is configured with one or more SRS resource configurations,
wherein when the UE is configured for reception of a downlink reference signal configured in the spatial relation info, the processing circuitry is to:
configure the UE to transmit the SRS resource in the two or more of the indicated CCs with a same spatial transmission filter that is used for reception of the downlink reference signal that is configured in the spatial relation info, the downlink reference signal comprising one of a synchronization signal/physical broadcast channel (SS/PBCH) block or a channel state information reference signal (CSI-RS), and
wherein the memory is configured to store the MAC CE.

6. The apparatus of claim 5, wherein when the UE is configured for transmission of an uplink reference signal with the spatial relation info, the processing circuitry is to:
configure the UE to transmit the SRS resource in the two or more indicated CCs with a same spatial transmission filter that is used for transmission of the uplink reference signal configured in the spatial relation info.

7. The apparatus of claim 5, wherein the processing circuitry is further configured to apply the spatial relation info for SRS resources with a same SRS resource identifier (ID) as the SRS resource indicated in the MAC CE for active bandwidth parts (BWPs) in the indicated CCs.

8. The apparatus of claim 5, wherein when the UE is configured for beam management, the processing circuitry is configured to reuse spatial receive parameters acquired for a CC for other CCs.

9. The apparatus of claim 5, wherein transmission of the SRS resource in the two or more CCs comprise a joint beam transmission in accordance with carrier aggregation (CA) in a millimeter-wave frequency band (FR2).

10. The apparatus of claim 5, wherein for carrier aggregation, the processing circuitry is to configure the UE to transmit the SRS resource simultaneously with a physical uplink control channel (PUCCH) across CCs in different bands.

11. A non-transitory computer-readable storage medium that stores instructions for execution by processing circuitry of a user equipment (UE) configured for operation in a fifth generation (5G) new radio (NR) network, the instructions to configure the processing circuitry to:
decode a media access control Layer (MAC) control element (CE) (MAC CE) to activate a spatial relation info for a sounding reference signal (SRS) resource for two or more indicated component carriers (CCs);
apply the spatial relation info for the SRS resource for the two or more indicated CCs in response to the activation; and
configure the UE to transmit the SRS resource in the two or more indicated CCs with a same spatial transmission filter that is used for another reference signal configured in the spatial relation info when the UE is configured with one or more SRS resource configurations and when the spatial relation info is activated,
wherein transmission of the SRS resource in the two or more CCs comprises a joint beam transmission in accordance with carrier aggregation (CA) in a millimeter-wave frequency band (FR2).

12. A non-transitory computer-readable storage medium that stores instructions for execution by processing circuitry of a user equipment (UE) configured for operation in a fifth generation (5G) new radio (NR) network, the instructions to configure the processing circuitry to:
decode a media access control Layer (MAC) control element (CE) (MAC CE) to activate a spatial relation info for a sounding reference signal (SRS) resource for two or more indicated component carriers (CCs);
apply the spatial relation info for the SRS resource for the two or more indicated CCs in response to the activation; and
configure the UE to transmit the SRS resource in the two or more indicated CCs with a same spatial transmission filter that is used for another reference signal configured in the spatial relation info when the UE is configured with one or more SRS resource configurations and when the spatial relation info is activated, and
wherein when the UE is configured for reception of a downlink reference signal configured in the spatial relation info, the processing circuitry is to:
configure the UE to transmit the SRS resource in the two or more indicated CCs with a same spatial transmission filter that is used for reception of the downlink reference signal that is configured in the spatial relation info, the downlink reference signal comprising one of a synchronization signal/physical broadcast channel (SS/PBCH) block or a channel state information reference signal (CSI-RS).

13. The non-transitory computer-readable storage medium of claim 12, wherein when the UE is configured for transmission of an uplink reference signal with the spatial relation info, the processing circuitry is to:
configure the UE to transmit the SRS resource in the two or more indicated CCs with a same spatial transmission filter that is used for transmission of the uplink reference signal configured in the spatial relation info.

14. The non-transitory computer-readable storage medium of claim 12, wherein the processing circuitry is further configured to apply the spatial relation info for SRS resources with a same SRS resource identifier (ID) as the SRS resource indicated in the MAC CE for active bandwidth parts (BWPs) in the indicated CCs.

15. The non-transitory computer-readable storage medium of claim 14, wherein when the UE is configured for beam management, spatial receive parameters acquired for a CC are reused for other CCs.

16. The non-transitory computer-readable storage medium of claim 12, wherein transmission of the SRS resource in the two or more CCs comprise a joint beam transmission in accordance with carrier aggregation (CA) in a millimeter-wave frequency band (FR2).

17. The non-transitory computer-readable storage medium of claim 12, wherein for carrier aggregation, the processing circuitry is to configure the UE to transmit the SRS resource simultaneously with a physical uplink control channel (PUCCH) across CCs in different bands.

18. A system for a user equipment (UE) configured for operation in a fifth generation (5G) new radio (NR) network, the system comprising:
two or more antennas coupled to transceiver circuitry;
processing circuitry; and
memory,
the processing circuitry configured to:
decode a media access control Layer (MAC) control element (CE) (MAC CE) to activate a spatial relation info for a sounding reference signal (SRS) resource for two or more indicated component carriers (CCs);
apply the spatial relation info for the SRS resource for the two or more indicated CCs in response to the activation; and
when the spatial relation info is activated, configure the transceiver circuitry to transmit the SRS resource in the two or more of the indicated CCs with a same spatial transmission filter that is used for another reference signal configured in the spatial relation info when the UE is configured with one or more SRS resource configurations,
wherein transmission of the SRS resource in the two or more CCs comprise a joint beam transmission in accordance with carrier aggregation (CA) in a millimeter-wave frequency band (FR2), and
wherein the memory is configured to store the MAC CE.

19. A system for a user equipment (UE) configured for operation in a fifth generation (5G) new radio (NR) network, the system comprising:
two or more antennas coupled to transceiver circuitry;
processing circuitry; and
memory,
the processing circuitry configured to:
decode a media access control Layer (MAC) control element (CE) (MAC CE) to activate a spatial relation info for a sounding reference signal (SRS) resource for two or more indicated component carriers (CCs);
apply the spatial relation info for the SRS resource for the two or more indicated CCs in response to the activation; and
when the spatial relation info is activated, configure the transceiver circuitry to transmit the SRS resource in the two or more of the indicated CCs with a same spatial transmission filter that is used for another reference signal configured in the spatial relation info when the UE is configured with one or more SRS resource configurations, and
wherein when the UE is configured for reception of a downlink reference signal configured in the spatial relation info, the processing circuitry is to:
configure the transceiver circuitry to transmit the SRS resource in the two or more of the indicated CCs with a same spatial transmission filter that is used for reception of the downlink reference signal that is configured in the spatial relation info, the downlink reference signal comprising one of a synchronization signal/physical broadcast channel (SS/PBCH) block or a channel state information reference signal (CSI-RS), and
wherein the memory is configured to store the MAC CE.

20. The system of claim 19, wherein when the UE is configured for transmission of an uplink reference signal with the spatial relation info, the processing circuitry is to:
configure the transceiver circuitry to transmit the SRS resource in the two or more indicated CCs with a same spatial transmission filter that is used for transmission of the uplink reference signal configured in the spatial relation info.

* * * * *